United States Patent
Chang

(10) Patent No.: US 7,213,818 B2
(45) Date of Patent: May 8, 2007

(54) STROLLER HAVING WHEEL ROTATION CONTROL DEVICE

(75) Inventor: Chung-Hui Chang, Taipei (TW)

(73) Assignee: Abmex Enterprise Co., Ltd., Taipei (TW)

( * ) Notice: Subject to any disclaimer, the term of this patent is extended or adjusted under 35 U.S.C. 154(b) by 342 days.

(21) Appl. No.: 10/924,527

(22) Filed: Aug. 24, 2004

(65) Prior Publication Data

US 2006/0043688 A1 Mar. 2, 2006

(51) Int. Cl.
*B62B 9/08* (2006.01)

(52) U.S. Cl. ................................ 280/47.38; 16/35 R

(58) Field of Classification Search ............. 280/642, 280/647, 650, 47.38; 16/35 R
See application file for complete search history.

(56) References Cited

U.S. PATENT DOCUMENTS

| | | | | |
|---|---|---|---|---|
| 2,188,648 A | * | 1/1940 | Bouvier et al. | 16/35 R |
| 3,890,668 A | * | 6/1975 | Stosberg et al. | 16/35 R |
| 4,028,773 A | * | 6/1977 | Morgan | 16/35 R |
| 4,336,629 A | * | 6/1982 | Jarvis et al. | 16/35 R |
| 4,349,937 A | * | 9/1982 | Fontana | 16/35 R |
| 4,349,938 A | * | 9/1982 | Fontana | 16/35 R |
| 4,759,098 A | * | 7/1988 | Ko | 16/29 |
| 5,461,753 A | * | 10/1995 | Rounds | 16/21 |
| 5,517,718 A | * | 5/1996 | Eichhorn | 16/35 R |
| 5,590,896 A | * | 1/1997 | Eichhorn | 280/642 |
| 5,660,435 A | * | 8/1997 | Eichhorn | 297/219.12 |
| 5,669,624 A | * | 9/1997 | Eichhorn | 280/642 |
| 5,899,469 A | * | 5/1999 | Pinto et al. | 280/79.11 |
| 6,402,166 B1 | * | 6/2002 | Chiu | 280/47.38 |
| 6,584,641 B1 | * | 7/2003 | Milbredt | 16/35 R |
| 6,671,926 B2 | * | 1/2004 | Huang | 16/35 R |
| 6,779,804 B1 | * | 8/2004 | Liu | 280/47.38 |
| 6,871,380 B2 | * | 3/2005 | Chen | 16/35 R |
| 6,974,150 B2 | * | 12/2005 | Jane Santamaria | 280/647 |
| 7,083,175 B1 | * | 8/2006 | Liu | 280/47.38 |
| 2004/0226134 A1 | * | 11/2004 | Chen | 16/35 R |
| 2005/0121865 A1 | * | 6/2005 | Liao | 280/38 |
| 2005/0140105 A1 | * | 6/2005 | Hernandez | 280/62 |

* cited by examiner

*Primary Examiner*—Jeff Restifo
(74) *Attorney, Agent, or Firm*—Alan D. Kamrath; Nikolai & Mersereau, P.A.

(57) ABSTRACT

A stroller includes a wheel, a rotation control device mounted above the wheel, and a wire control device mounted on a position that facilitates operation of a user and connected to the rotation control device to lock and unlock the rotation control device between. Thus, the wire control device is mounted on a position that facilitates operation of the user, so that the user directly controls rotation of the wheel, thereby facilitating the user controlling the moving direction of the stroller.

19 Claims, 7 Drawing Sheets

STROLLER HAVING WHEEL ROTATION CONTROL DEVICE

BACKGROUND OF THE INVENTION

1. Field of the Invention

The present invention relates to a stroller, and more particularly to a stroller having a wheel rotation control device.

2. Description of the Related Art

A conventional stroller comprises a wheel, a bottom frame, a rear frame, a rear wheel, a push handle, and a rotation control device mounted between the bottom frame and the wheel to control rotation movement of the wheel so as to control the moving direction of the stroller. However, the rotation control device is located at the front side of the stroller, so that a user located at the rear side of the stroller has to move forward to operate the rotation control device to control rotation movement of the wheel, thereby causing inconvenience to the user in operating the rotation control device.

SUMMARY OF THE INVENTION

In accordance with the present invention, there is provided a stroller, comprising:

a wheel;

a rotation control device mounted above the wheel; and a wire control device mounted on a position that facilitates operation of a user and connected to the rotation control device to drive the rotation control device between a first position where the rotation control device is locked so that the wheel is fixed and a second position where the rotation control device is unlocked so that the wheel is rotatable.

The primary objective of the present invention is to provide a stroller, wherein the wire control device is mounted on a position that facilitates operation of the user, so that the user directly controls rotation of the wheel, thereby facilitating the user controlling the moving direction of the stroller.

Another objective of the present invention is to provide a stroller, wherein the rotation control device and the wire control device of the stroller are operated easily and conveniently, thereby facilitating the user controlling the stroller.

A further objective of the present invention is to provide a stroller, wherein the user can operate the wire control device of the stroller by his one hand only, thereby facilitating the user operating the stroller.

Further benefits and advantages of the present invention will become apparent after a careful reading of the detailed description with appropriate reference to the accompanying drawings.

DETAILED DESCRIPTION OF THE INVENTION

Figure 1:
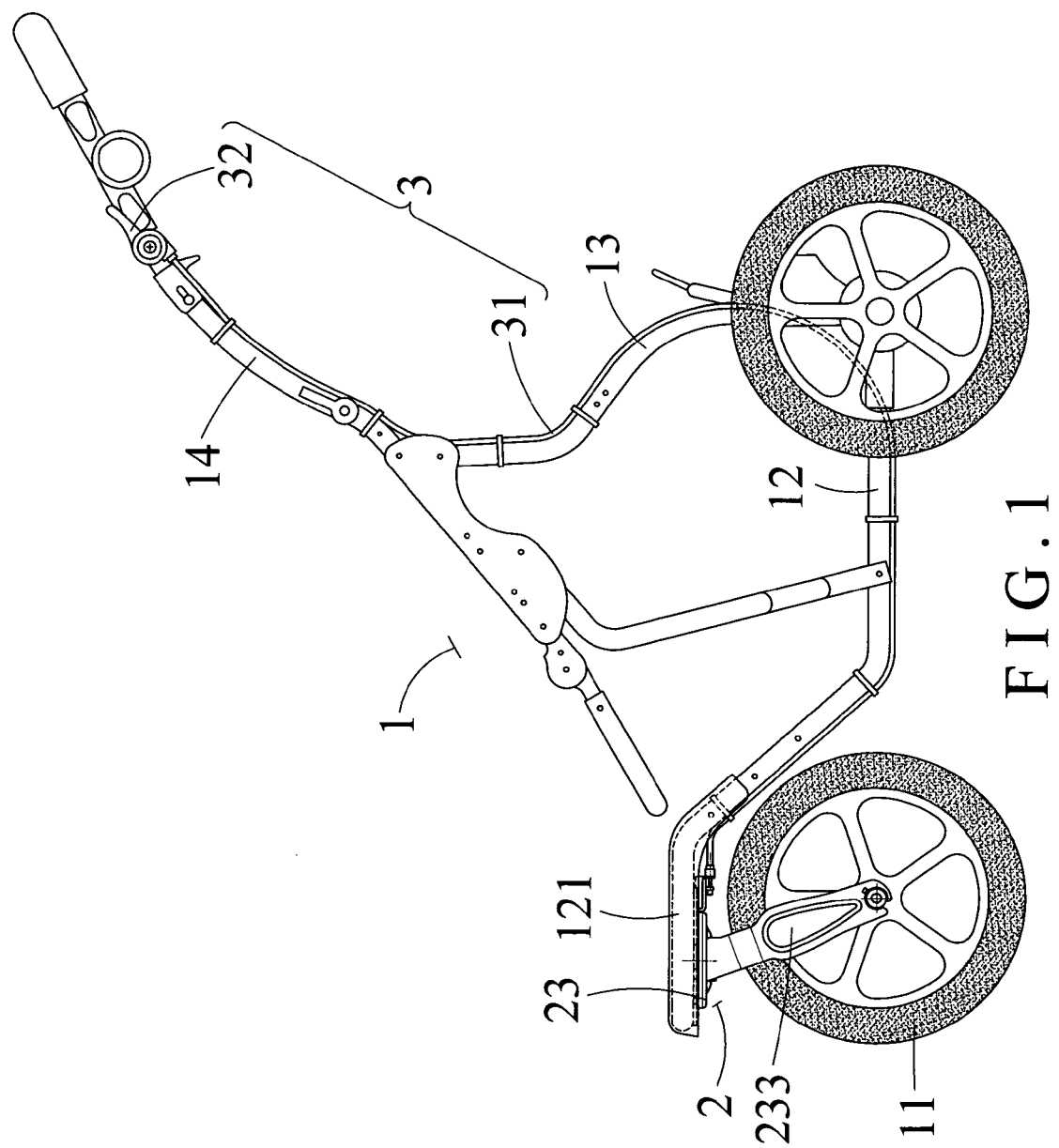
FIG. 1 is a side plan view of a stroller in accordance with the preferred embodiment of the present invention.
Figure 2:
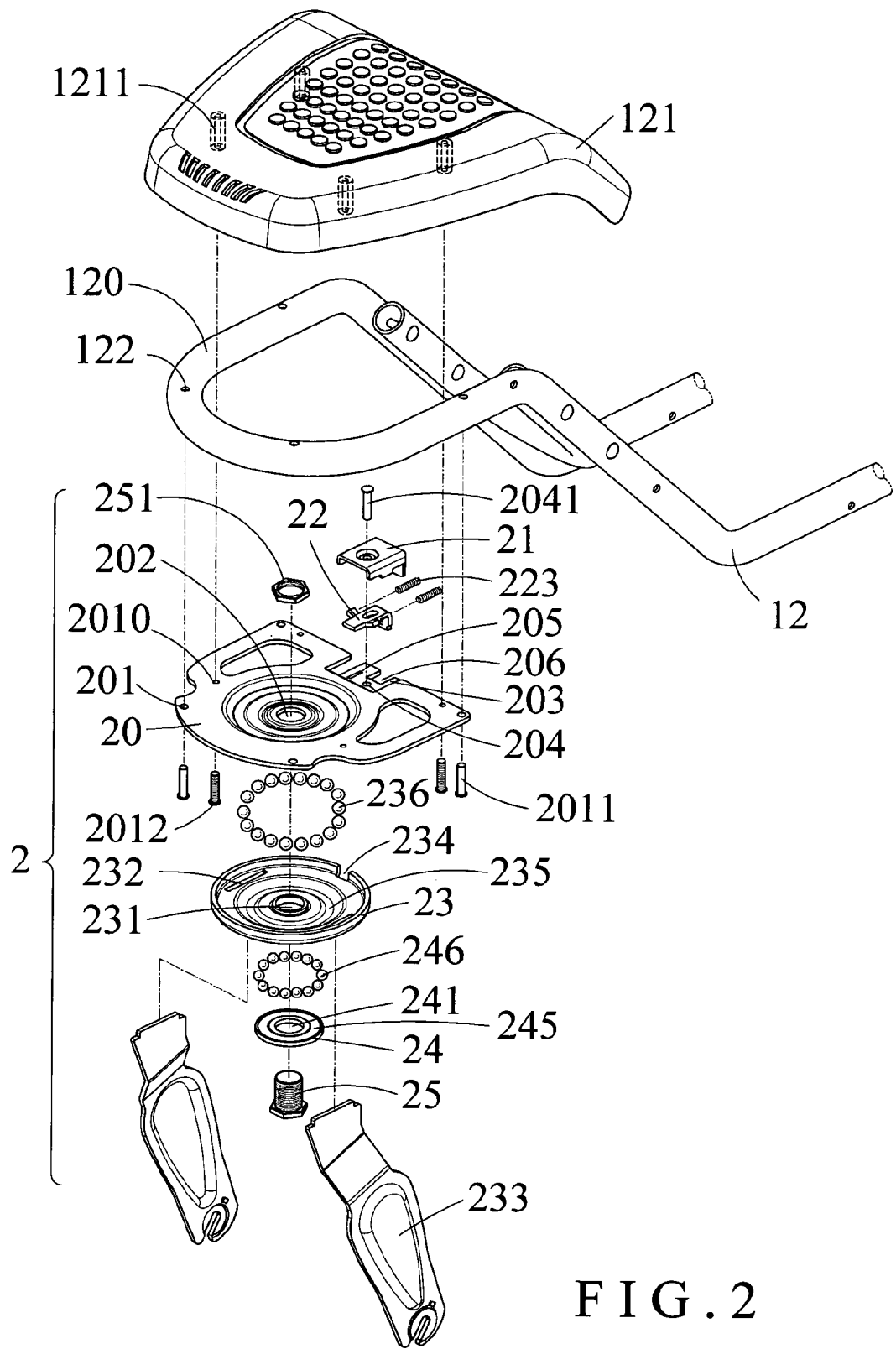
FIG. 2 is a partially cut-away exploded perspective view of the stroller as shown in FIG. 1.
Figure 3:
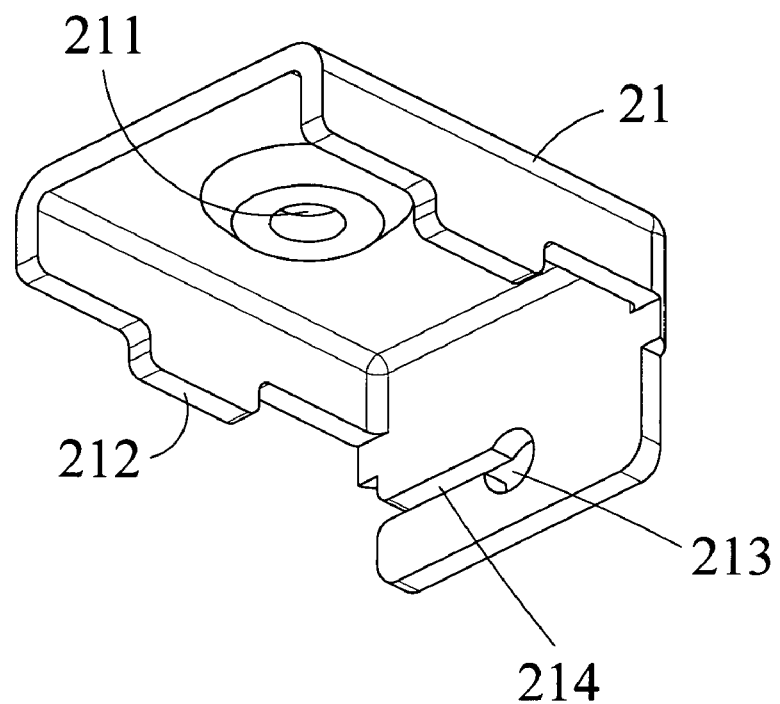
FIG. 3 is a perspective view of a cover of the stroller as shown in FIG. 2.
Figure 4:
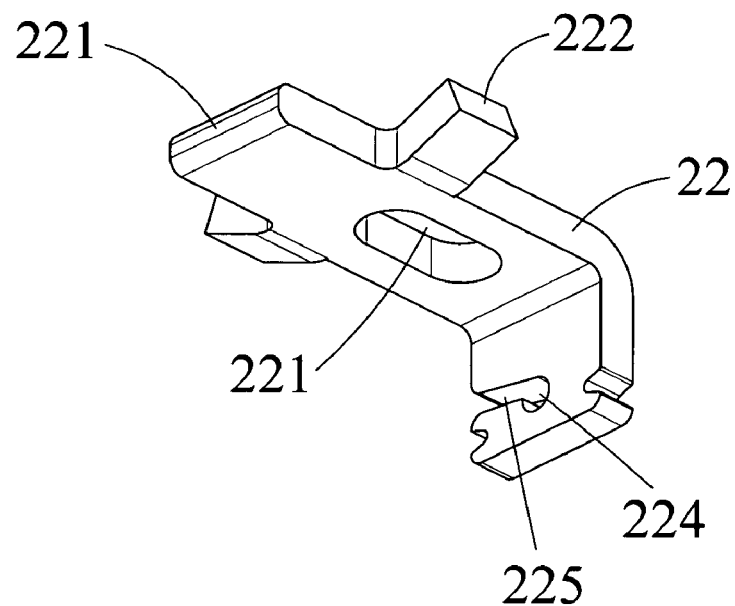
FIG. 4 is a perspective view of a locking plate of the stroller as shown in FIG. 2.

Referring to the drawings and initially to FIGS. 1–6, a stroller 1 in accordance with the preferred embodiment of the present invention comprises a wheel 11, a bottom frame 12, a rear frame 13, a push handle 14, a rotation control device 2 mounted between the bottom frame 12 and the wheel 11, and a wire control device 3 extended through the bottom frame 12, the rear frame 13 and the push handle 14 and connected to the rotation control device 2 to drive the rotation control device 2 between a first position where the rotation control device 2 is locked so that the wheel 11 is fixed on the bottom frame 12 and a second position where the rotation control device 2 is unlocked so that the wheel 11 is rotatable relative to the bottom frame 12.

The bottom frame 12 has an oblique front end formed with a support portion 120. The support portion 120 of the bottom frame 12 has a periphery formed with a plurality of fixing holes 122. A foot step 121 is mounted on a top of the support portion 120 of the bottom frame 12. The foot step 121 has a bottom formed with a plurality of threaded tubes 1211.

The rotation control device 2 includes a fixing seat 20, a cover 21, a rotation disk 23, a locking plate 22, and a support disk 24.

The fixing seat 20 of the rotation control device 2 is secured on a bottom of the support portion 120 of the bottom frame 12. The fixing seat 20 of the rotation control device 2 has a periphery formed with a plurality of fixing holes 201 combined with the fixing holes 122 of the support portion 120 of the bottom frame 12 by a plurality of fixing pins 2011 to fix the fixing seat 20 of the rotation control device 2 on the support portion 120 of the bottom frame 12. The fixing seat 20 of the rotation control device 2 is formed with a plurality of fixing bores 2010 combined with the threaded tubes 1211 of the foot step 121 by a plurality of threaded rods 2012 to fix the fixing seat 20 of the rotation control device 2 on the foot step 121. The fixing seat 20 of the rotation control device 2 has a recessed central portion formed with a circular hole 202. The fixing seat 20 of the rotation control device 2 has a side formed with a substantially L-shaped connecting plate 203 having a first section formed with a passage 208 (see FIG. 5) and a second section formed with two elongated insertion slots 205 and a through hole 204 located between the two insertion slots 205. The second section of the connecting plate 203 of the fixing seat 20 has an edge formed with a cutout 206.

The cover 21 of the rotation control device 2 is secured on the connecting plate 203 of the fixing seat 20. The cover 21 of the rotation control device 2 has a substantially L-shaped cross-section and has a first section formed with two opposite insertion plates 212 each inserted into a respective one of the two insertion slots 205 of the connecting plate 203 of the fixing seat 20 and a second section formed with a through bore 213 having a side formed with an elongated opening 214. The first section of the cover 21 is formed with a through hole 211 aligning with the through hole 204 of the connecting plate 203 of the fixing seat 20.

The rotation disk 23 of the rotation control device 2 is rotatably mounted on a bottom of the fixing seat 20 and has a peripheral wall formed with a locking recess 234 aligning with the passage 208 of the connecting plate 203 of the fixing seat 20. The rotation disk 23 of the rotation control device 2 has a central portion formed with a circular hole 231 aligning with the circular hole 202 of the fixing seat 20. The rotation disk 23 of the rotation control device 2 has a surface formed with two radially opposite fixing slots 232. The rotation control device 2 further includes two wheel support plates 233 each having a first end secured on the rotation disk 23 to rotate therewith and a second end mounted on the wheel 11. Preferably, the first end of each of the two wheel support plates 233 is fixed in a respective one of the two fixing slots 232 of the rotation disk 23 by soldering. The rotation disk 23 of the rotation control device 2 is formed with an annular groove 235 for mounting a plurality of rolling balls 236 rested on the bottom of the fixing seat 20.

The locking plate 22 of the rotation control device 2 is slidably mounted on the connecting plate 203 of the fixing seat 20 and the cover 21. The locking plate 22 of the rotation control device 2 has a substantially L-shaped cross-section and has a first section having a locking end 220 extended through the passage 208 of the connecting plate 203 of the fixing seat 20 and detachably locked in the locking recess 234 of the rotation disk 23. The locking plate 22 of the rotation control device 2 has a second section slidably mounted in the cutout 206 of the connecting plate 203 of the fixing seat 20 and formed with a through bore 224 having a side formed with an elongated opening 225. The first section of the locking plate 22 is formed with an elongated guide slot 221 aligning with the through hole 204 of the connecting plate 203 of the fixing seat 20 and the through hole 211 of the cover 21, and the rotation control device 2 further includes a connecting pin 2041 extended through the through hole 211 of the cover 21, the guide slot 221 of the locking plate 22 and the through hole 204 of the connecting plate 203 of the fixing seat 20 to guide movement of the locking plate 22. The first section of the locking plate 22 is formed with two opposite support studs 222, and the rotation control device 2 further includes two elastic members 223 each mounted between the second section of the cover 21 and a respective one of the two support studs 222 of the locking plate 22 to push the locking plate 22 toward the rotation disk 23.

The support disk 24 of the rotation control device 2 is mounted on a bottom of the rotation disk 23 and has a surface formed with an annular groove 245 for mounting a plurality of rolling balls 246 rested on the bottom of the rotation disk 23. The support disk 24 of the rotation control device 2 has a central portion formed with a circular hole 241 aligning with the circular hole 231 of the rotation disk 23, and the rotation control device 2 further includes a locking bolt 25 extended through the circular hole 241 of the support disk 24, the circular hole 231 of the rotation disk 23 and the circular hole 202 of the fixing seat 20, and a locking nut 251 screwed onto the locking bolt 25.

The wire control device 3 includes a flexible wire 31 extended through the bottom frame 12 and the rear frame 13 and having a first end secured on the locking plate 22 of the rotation control device 2 to control movement of the locking plate 22 of the rotation control device 2, and a control lever 32 pivotally mounted on the push handle 14 and connected to a second end of the flexible wire 31 to control movement of the flexible wire 31. The first end of the flexible wire 31 is extended through the through bore 213 of the cover 21 and the through bore 224 of the locking plate 22 and is fixed on the second section of the locking plate 22. The first end of the flexible wire 31 is provided with a locking block 311 rested on the second section of the locking plate 22 and a stop block 312 rested on the second section of the cover 21.

Figure 5:
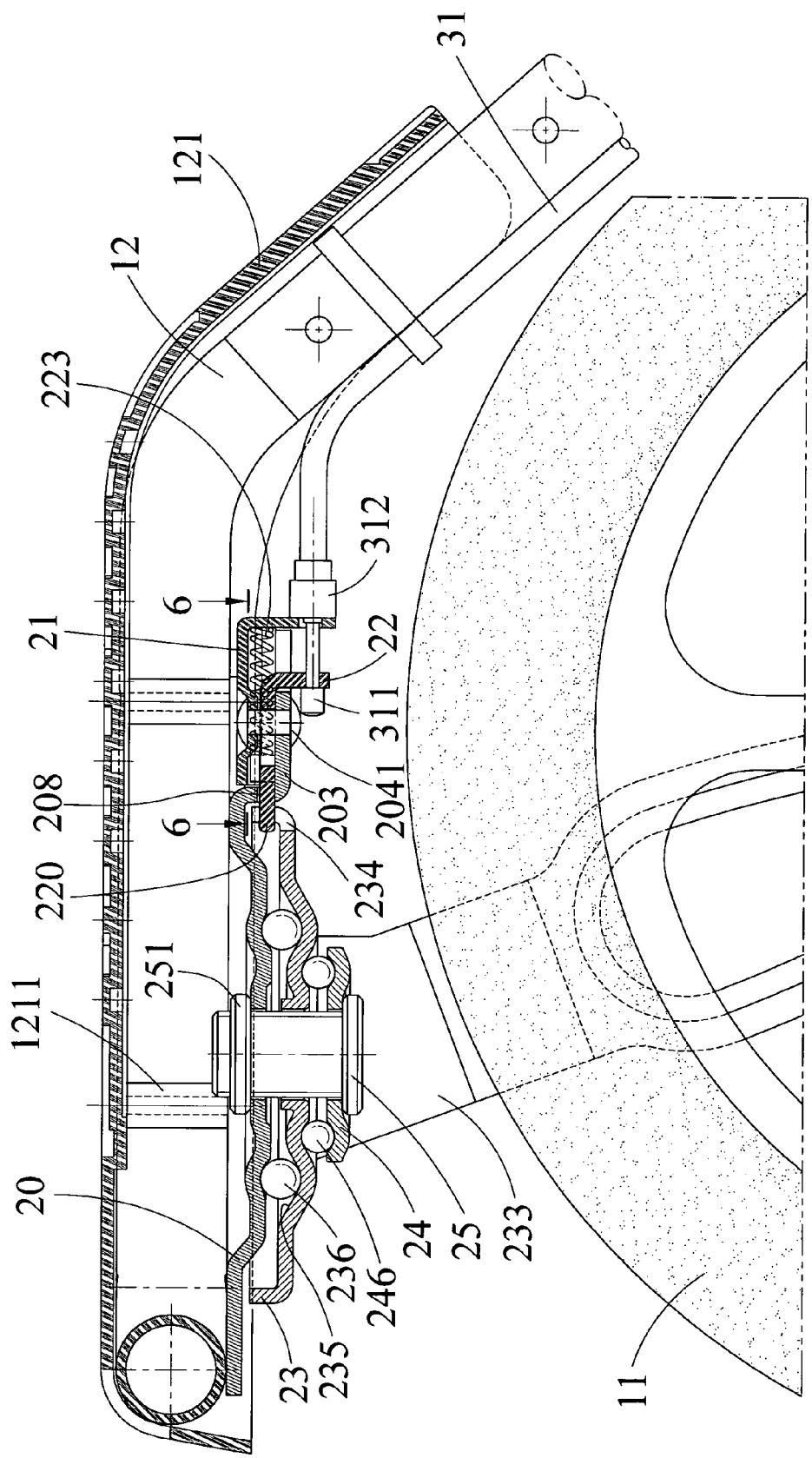
FIG. 5 is a partially side plan cross-sectional view of the stroller as shown in FIG. 1.
Figure 6:
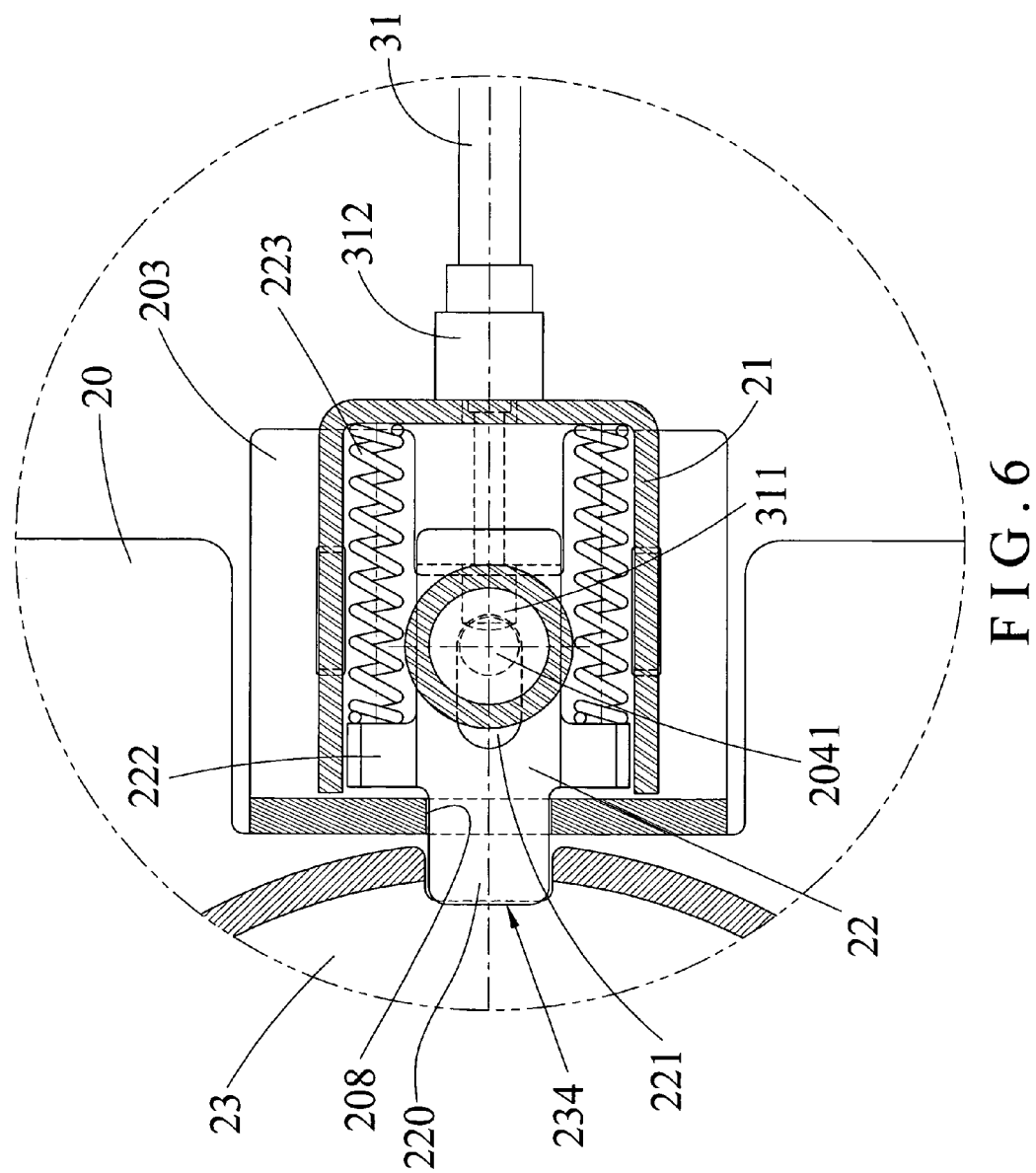
FIG. 6 is a partially top plan cross-sectional view of the stroller as shown in FIG. 1.

In operation, referring to FIGS. 5–8 with reference to FIGS. 1–4, the locking plate 22 is pushed toward the rotation disk 23 by the elastic force of the two elastic members 223, so that the locking end 220 of the locking plate 22 is inserted into and locked in the locking recess 234 of the rotation disk 23 as shown in FIGS. 5 and 6 so as to lock the rotation disk 23 on the fixing seat 20. In such a manner, the rotation disk 23 is locked on the fixing seat 20 without rotation, so that the wheel support plates 233 and the wheel 11 are fixed on the fixing seat 20 without rotation.

Figure 7:
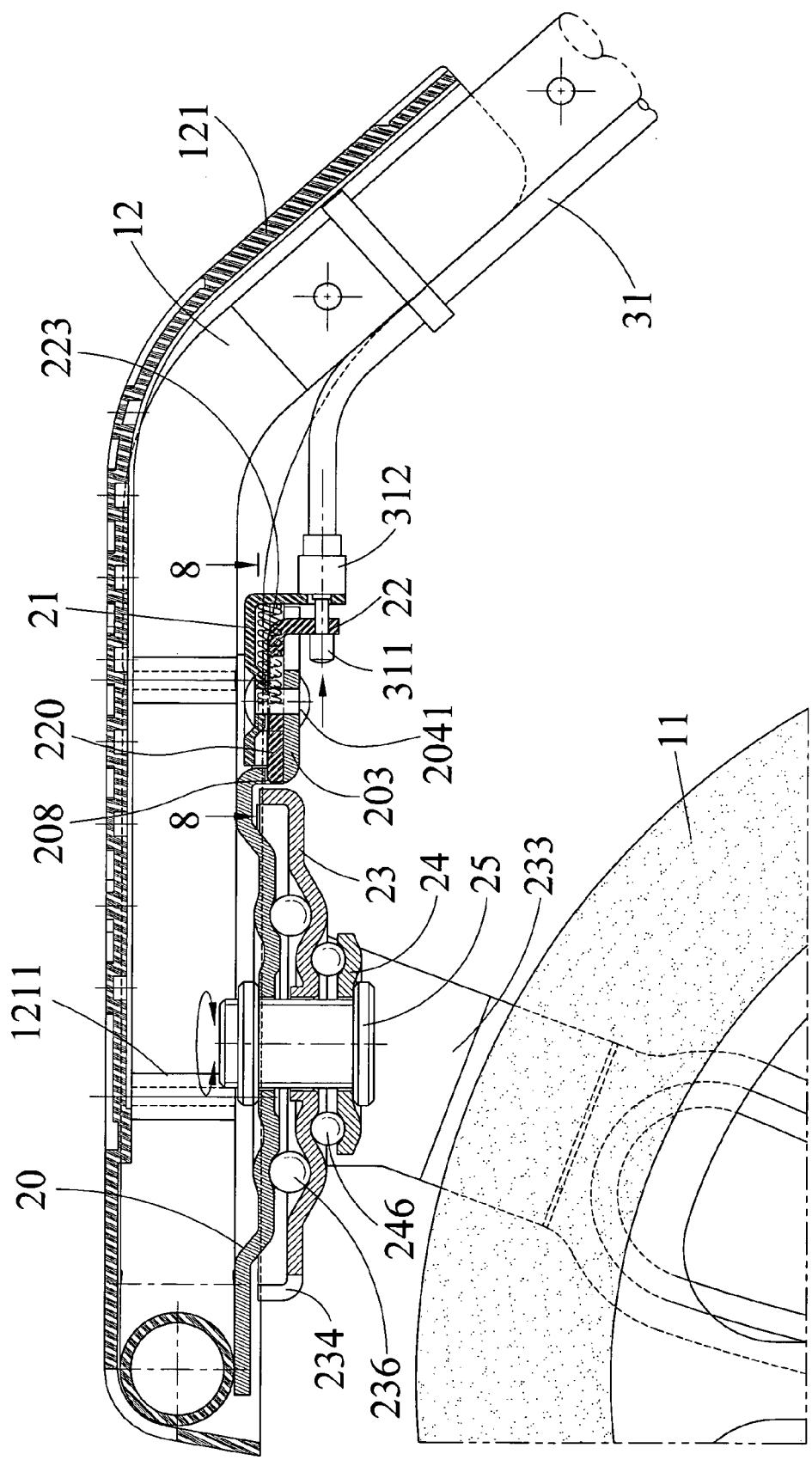
FIG. 7 is a schematic operational view of the stroller as shown in FIG. 5.
Figure 8:
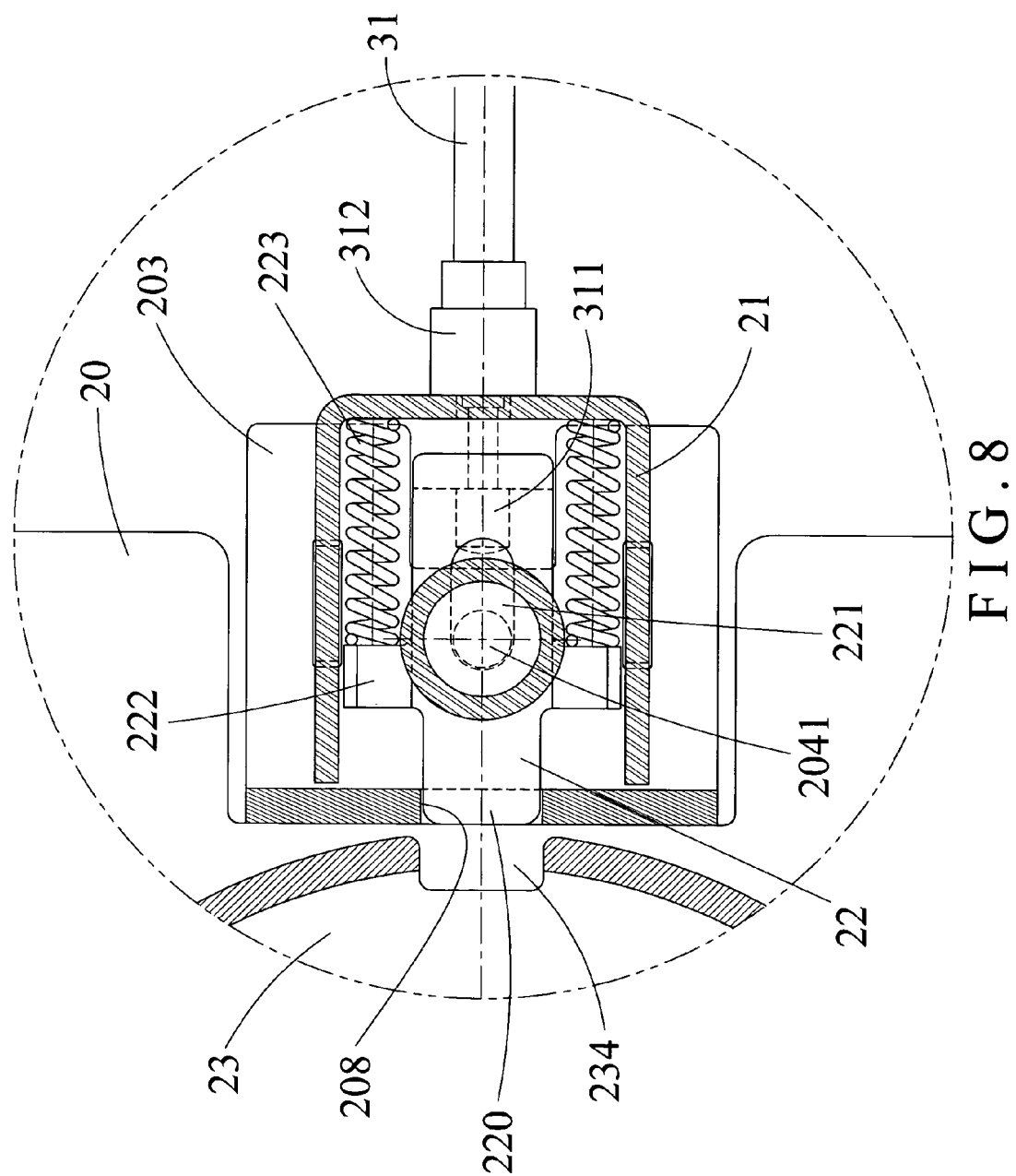
FIG. 8 is a schematic operational view of the stroller as shown in FIG. 6.

Alternatively, when the control lever 32 is pulled by the user, the flexible wire 31 is moved by operation of the control lever 32 to pull the locking plate 22 to move backward and to compress the two elastic members 223, so that the locking end 220 of the locking plate 22 is moved backward to detach from the locking recess 234 of the rotation disk 23 so as to unlock the rotation disk 23 from the fixing seat 20. In such a manner, the rotation disk 23 is rotated freely relative to the fixing seat 20, so that the wheel support plates 233 and the wheel 11 are rotated freely relative to the fixing seat 20 as shown in FIGS. 7 and 8.

Accordingly, the wire control device is mounted on a position that facilitates operation of the user, so that the user directly controls rotation of the wheel, thereby facilitating the user controlling the moving direction of the stroller. In addition, the rotation control device and the wire control device of the stroller are operated easily and conveniently, thereby facilitating the user controlling the stroller. Further, the user can operate the wire control device of the stroller by his one hand only, thereby facilitating the user operating the stroller.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A stroller, comprising:
   a wheel;
   a rotation control device mounted above the wheel; and
   a wire control device mounted on a position that facilitates operation of a user and connected to the rotation control device to drive the rotation control device between a first position where the rotation control device is locked so that the wheel is fixed and a second position where the rotation control device is unlocked so that the wheel is rotatable;
   wherein the rotation control device includes a fixing seat, a cover, a rotation disk, and a locking plate, wherein:
   the fixing seat of the rotation control device is secured on a bottom frame and has a side formed with a protruding connecting plate formed with a passage;
   the cover of the rotation control device is secured on the connecting plate of the fixing seat;
   the rotation disk of the rotation control device is rotatably mounted on a bottom of the fixing seat and has a peripheral wall formed with a locking recess aligning with the passage of the connecting plate of the fixing seat; and the locking plate of the rotation control device is slidably mounted on the connecting plate of the fixing seat and has a first section having a locking end extended through the passage of the connecting plate of the fixing seat and detachably locked in the locking recess of the rotation disk.

2. The stroller in accordance with claim 1, wherein the connecting plate of the fixing seat is substantially L-shaped.

3. The stroller in accordance with claim 1, wherein the connecting plate of the fixing seat has a first section formed with the passage.

4. The stroller in accordance with claim 1, wherein the connecting plate of the fixing seat has a second section formed with two elongated insertion slots, and the cover of the rotation control device has a first section formed with two opposite insertion plates each inserted into a respective one of the two insertion slots of the connecting plate of the fixing seat.

5. The stroller in accordance with claim 1, wherein the connecting plate of the fixing seat has a second section formed with a through hole, the first section of the cover is formed with a through hole aligning with the through hole of the connecting plate of the fixing seat, the first section of the locking plate is formed with an elongated guide slot aligning with the through hole of the connecting plate of the fixing seat and the through hole of the cover, and the rotation control device further includes a connecting pin extended through the through hole of the cover, the guide slot of the locking plate and the through hole of the connecting plate of the fixing seat to guide movement of the locking plate.

6. The stroller in accordance with claim 1, wherein the cover of the rotation control device has a substantially L-shaped cross-section.

7. The stroller in accordance with claim 1, wherein the rotation control device further includes two wheel support plates each having a first end secured on the rotation disk to rotate therewith and a second end mounted on the wheel.

8. The stroller in accordance with claim 7, wherein the rotation disk of the rotation control device has a surface formed with two radially opposite fixing slots, and the first end of each of the two wheel support plates is fixed in a respective one of the two fixing slots of the rotation disk.

9. The stroller in accordance with claim 1, wherein the rotation disk of the rotation control device is formed with an annular groove for mounting a plurality of rolling balls rested on the bottom of the fixing seat.

10. The stroller in accordance with claim 1, wherein the locking plate of the rotation control device has a substantially L-shaped cross-section.

11. The stroller in accordance with claim 1, wherein the connecting plate of the fixing seat has a second section having an edge formed with a cutout, and the locking plate of the rotation control device has a second section slidably mounted in the cutout of the connecting plate of the fixing seat.

12. The stroller in accordance with claim 1, wherein the first section of the locking plate is formed with two opposite support studs, and the rotation control device further includes two elastic members each mounted between the cover and a respective one of the two support studs of the locking plate to push the locking plate toward the rotation disk.

13. The stroller in accordance with claim 1, wherein the fixing seat of the rotation control device has a recessed central portion formed with a circular hole, the rotation disk of the rotation control device has a central portion formed with a circular hole aligning with the circular hole of the fixing seat, and the rotation control device further includes a support disk mounted on a bottom of the rotation disk and having a central portion formed with a circular hole aligning with the circular hole of the rotation disk, and a locking bolt extended through the circular hole of the support disk, the circular hole of the rotation disk and the circular hole of the fixing seat, and a locking nut screwed onto the locking bolt.

14. The stroller in accordance with claim 13, wherein the support disk has a surface formed with an annular groove for mounting a plurality of rolling balls rested on the bottom of the rotation disk.

15. The stroller in accordance with claim 1, wherein the wire control device includes a flexible wire having a first end secured on the locking plate of the rotation control device to control movement of the locking plate of the rotation control device, and a control lever pivotally mounted on a position that facilitates operation of the user and connected to a second end of the flexible wire to control movement of the flexible wire.

16. The stroller in accordance with claim 15, wherein the cover of the rotation control device has a second section formed with a through bore having a side formed with an elongated opening, the locking plate of the rotation control device has a second section formed with a through bore having a side formed with an elongated opening, and the first end of the flexible wire is extended through the through bore of the cover and the through bore of the locking plate and is fixed on the second section of the locking plate.

17. The stroller in accordance with claim 15, wherein the first end of the flexible wire is provided with a locking block rested on the second section of the locking plate and a stop block rested on the second section of the cover.

18. The stroller in accordance with claim 1, wherein the bottom frame has an oblique front end formed with a support portion having a periphery formed with a plurality of fixing holes, and the fixing seat of the rotation control device is secured on a bottom of the support portion of the bottom frame and has a periphery formed with a plurality of fixing holes combined with the fixing holes of the support portion of the bottom frame by a plurality of fixing pins to fix the fixing seat of the rotation control device on the support portion of the bottom frame.

19. The stroller in accordance with claim 18, further comprising a foot step mounted on a top of the support portion of the bottom frame and having a bottom formed with a plurality of threaded tubes, wherein the fixing seat of the rotation control device is formed with a plurality of fixing bores combined with the threaded tubes of the foot step by a plurality of threaded rods to fix the fixing seat of the rotation control device on the foot step.

* * * * *